United States Patent
Drapeau

(10) Patent No.: US 6,287,589 B1
(45) Date of Patent: Sep. 11, 2001

(54) METHOD AND APPARATUS FOR STIMULATING OVULATION IN INDUCED OVULATION MAMMALS AS A MEAN OF CONTRACEPTION

(76) Inventor: Richard Drapeau, 61 Rue Papillon, St-Alphonse-Rodriguez (CA), J0K 1W0

( * ) Notice: Subject to any disclaimer, the term of this patent is extended or adjusted under 35 U.S.C. 154(b) by 0 days.

(21) Appl. No.: 09/163,181

(22) Filed: Sep. 30, 1998

(30) Foreign Application Priority Data

Oct. 1, 1997 (CA) .................................................. 2213791

(51) Int. Cl.[7] ................................. A61F 6/06; A61F 6/14
(52) U.S. Cl. ........................ 424/430; 128/830; 128/839; 119/174
(58) Field of Search ............................ 424/430; 119/174; 128/830, 839

(56) References Cited

U.S. PATENT DOCUMENTS 3,854,476 * 12/1974 Dickinson, III et al. ............ 128/138

OTHER PUBLICATIONS

Concannon et al, "Current and proposed methods for contraception and termination of pregnancy in dogs and cats", JAVMA, vol. 198, No. 7, pp. 1214–1225, Apr. 1991.*

* cited by examiner

Primary Examiner—Frederick Krass

(57) ABSTRACT

A contraceptive method of inducing ovulation in induced ovulation mammals, in particular the female cat, by stimulating mainly the cervical region of the vagina to trigger a cascade of hormonal reactions to cause ovulation and pseudo-pregnancy to eliminate the unwanted behavior of female cats in heat. The treatment consists in the introduction of an ovulator inside the vaginal cavity of the animal. This apparatus is similar in shape and size to the penis of a cat, is made of a soft flexible material and is safe and easy to clean. The method imitates the sexual behavior of cats by causing a repeated number of brief stimulations at the peak of the estrus cycle.

4 Claims, 1 Drawing Sheet

Figure 1:
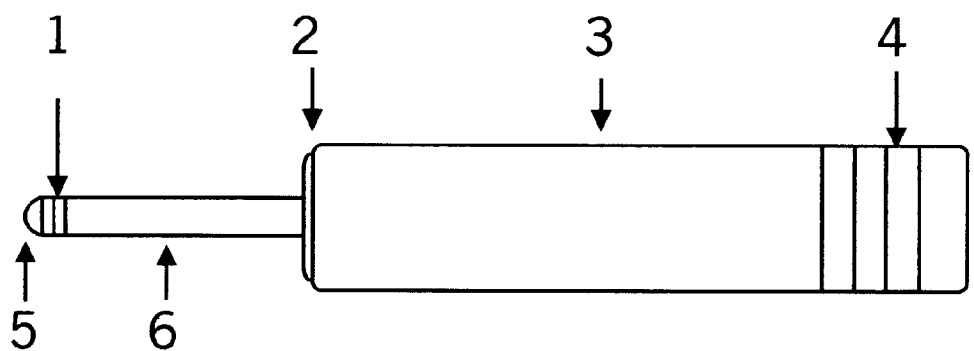

METHOD AND APPARATUS FOR STIMULATING OVULATION IN INDUCED OVULATION MAMMALS AS A MEAN OF CONTRACEPTION

BACKGROUND OF THE INVENTION.

Motivated by the desire to find an alternative to spaying (ovariohysterectomy), which removes healthy organs for a healthy female cat, I explored different alternatives to prevent the unwanted behavior of female cats in heat and to prevent unwanted litters. I found that it was known by some veterinarians that when they collected cell samples from the vaginal cavity of female cats, that this procedure sometimes induced accidental ovulation. This ovulation in turn ends the unwanted behavior and frees unfertilized eggs, which will remain unfertilized because the female is no more responsive to males. Some cat breeders, who would not spay their queens, use sterile males to induce ovulation and relieve the females from the stress of their heat period. I invented an ovulator to substitute a sterile male or a veterinarian's instrument to use in precise conditions and following a detailed method to stimulate ovulation and cause the ovulation to initiate a pseudo-pregnancy, stop the hear behavior and prevent unwanted litters. Spaying is a mutilation of healthy organs on healthy animals. My ovulator and method offer an alternative to cat owners whom presently only have a choice between unwanted litters or enduring the disagreeable heat behavior and on the other side, a major operation on a healthy animal.

BRIEF SUMMARY OF THE INVENTION.

The invention consists of an apparatus, hereafter called an ovulator, which is introduced in the vaginal cavity of a female cat in heat, to cause an ovulation by using the ovulator according to a method which prescribes when, how and how often to use the ovulator to stop the unwanted behavior. The embodiment of the ovulator can be modulated to fit domestic and professional uses and different mammals. The preferred embodiment is for an ovulator to be used by veterinarians on average size domestic cats. This ovulator is a generally cylindrical shape consisting of a tip analogous in shape and size to the penis of a cat and a handle shaped to prevent hurting the animal by limiting the depth of use. The ovulator is textured to hold therapeutic substances and serve as an applicator. It is generally made of a soft plastic material easy to clean.

DETAILED DESCRIPTION OF THE INVENTION

The principle and mode of operation of the ovulator is based on the fact that unlike humans, cats and camels amongst other mammals are induced ovulators. In humans, the female will spontaneously ovulate when her egg is mature. In camels, ovulation will only occur if the semen of the male is present in the vaginal cavity. In cats, ovulation will only occur if there is a physical contact with the vulvo-vaginal region, which is connected to the central nervous system. At the proximal part of the vagina there is a structure called the cervix which is especially sensitive to physical stimulation. Through a nerve system connected to the brain via the spinal cord, the mechanical stimulation is translated into nervous stimulus. Inside the brain, the hypothalamus, stimulated by this signal, releases gonadothropin hormone (GmRH) which acts on the pituitary gland, causing it to release (FSH) follicles stimulating hormone and (LH) luteinizing hormone. These hormones stimulate ovulation by acting on the follicles, and initiating the development of the corpus luteus. The corpus luteus produces progesterone which causes the female cat to go into pseudo-pregnancy for 4 to 6 weeks. One or 2 weeks after the pseudo-pregnancy a new heat period may follow. On average, almost two months will separate the onset of a heat period instead of two weeks if untreated.

The method also relies of the fact that the reproductive cycle of the cat is related to sunlight (and artificial light). Their reproductive system is photosensitive and ovulation will only occur if the days have more than 12 hours of sunlight (or artificial light). Providing a dark area where the animal can sleep or retire to will reduce the number of heat periods. Combining these facts, we come to three or four heat periods a year, all between the spring and fall equinoxes.

Male and female cats have brief but multiple sexual encounters lasting only a few moments but repeated many times a day. Taking into account that ovulation requires an adequate level of FSH and LH plus the knowledge that these levels are a result of physical stimulation this method requires multiple use of the ovulator. Adding the facts that an average litter is five kittens, we have to stimulate at least five ovulations. When performed at the proper time and with the proper method, two stimulations are sufficient for every ovum. Therefore, the usual procedure is ten treatments to eliminate the heat period by inducing ovulation of five eggs and initiating pseudo-pregnancy. The best moment to release the FSH and LH produced and stored in the pituitary gland is on the third day of estrus. Although each animal is somewhat different the initial procedure is three treatments on day two of estrus, five on day three and two or more on day four if the symptoms persist.

The treatment consists in the introduction of the ovulator in the vaginal cavity making sure the ovulator touches the cervix. Maintain the ovulator for three or four seconds inside the vagina. Wait one or two hours before the next treatment to allow sufficient production and storage of hormones in the pituitary gland. The ovulator is made of a soft flexible material and cannot harm the cat even is the user is maladroit. The ovulator should be cleaned in warm soapy water before and after use.

Five seconds, ten times every other summer months is three or four minutes a year to save a cat from spaying and to relieve the symptoms of estrus.

Figure 2:
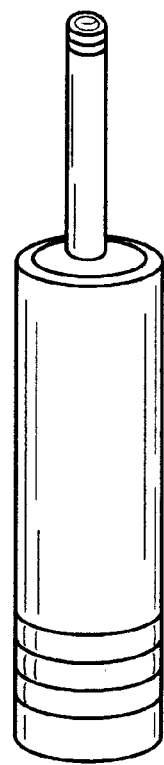

FIG. 2 is an enlarged perpective view of the ovulator.

I claim as my invention:

1. A contraceptive method for female cats in heat, comprising initiating induced ovulation by:
   (1) stimulating the cervix by guiding a stimulation device through the vulva and vaginal cavity to reach the cervix, wherein said stimulation device is applied no deeper than necessary to make contact with the cervix and is kept in contact therewith for 3 to 4 seconds per application, and
   (2) repeating the process 2 or 3 times a day for an interval of one to two hours on each of days 2, 3 and 4 of the onset of the heat period.

2. A contraceptive method for mammals in heat which are induced ovulators, comprising initiating induced ovulation by:

(1) stimulating the cervix by guiding a stimulation device through the vulva and vaginal cavity to reach the cervix, wherein said stimulation device is applied no deeper than necessary to make contact with the cervix and is kept in contact therewith for 3 to 4 seconds per application, and (2) repeating the process 2 or 3 times a day for an interval of one to two hours on each of days 2, 3 and 4 of the onset of the heat period.

3. An ovulator designed to apply the procedure of claim 1, comprising a soft, flexible, safe and easily washable apparatus sized and shaped to imitate the penis of a cat, having a proximal and distal portion and a rounded tip, the two portions being disposed along the same axis with the distal portion being larger in diameter than the proximal portion to form a physical guard against hurting the cat by limiting depth of use.

4. The ovulator of claim 3, which is made of different materials in different portions of the ovulator.

\* \* \* \* \*